United States Patent [19]
Tracy

[11] Patent Number: 4,880,071
[45] Date of Patent: Nov. 14, 1989

[54] TOY AIR VEHICLE

[76] Inventor: Stephen E. Tracy, P.O. Box 214, Odin, Ill. 62870

[21] Appl. No.: 230,516

[22] Filed: Aug. 10, 1988

[51] Int. Cl.$^4$ .............................................. B60V 1/00
[52] U.S. Cl. ................................... 180/117; 180/119; 244/12.3
[58] Field of Search ................ 180/117, 116, 119, 7.4; 244/12.4, 12.3, 23 A, 56, 66

[56] References Cited

U.S. PATENT DOCUMENTS

| | | | |
|---|---|---|---|
| 2,961,189 | 11/1960 | Doak | 244/12.4 |
| 2,989,269 | 6/1961 | LeBel | 180/117 |
| 3,045,951 | 7/1962 | Freeland | 180/117 X |
| 3,170,530 | 2/1965 | Black | 180/119 |
| 3,187,817 | 6/1965 | Colley | 180/117 X |
| 3,209,848 | 10/1965 | Holloway | 180/116 X |
| 3,292,721 | 12/1966 | Dobson | 180/117 X |
| 3,589,058 | 6/1971 | Labat | 180/117 X |
| 4,043,421 | 8/1977 | Smith | 180/117 |
| 4,313,512 | 2/1982 | Jutras | 180/117 |
| 4,537,372 | 8/1985 | Forizs | 244/12.4 |

Primary Examiner—John A. Pekar
Attorney, Agent, or Firm—Leon Gilden

[57] ABSTRACT

A toy air propelled vehicle is set forth that utilizes a plurality of rearwardly oriented aligned impellers with a forwardly positioned impeller to elevate the vehicle. The rear impellers are pivotal to provide directional orientation to the vehicle and additionally snap on pontoons are positioned to underlying skids of the vehicle where in association with 90 degree rotation of the rear impellers enables the vehicle to be utilized as an air boat.

5 Claims, 1 Drawing Sheet

U.S. Patent     Nov. 14, 1989     4,880,071
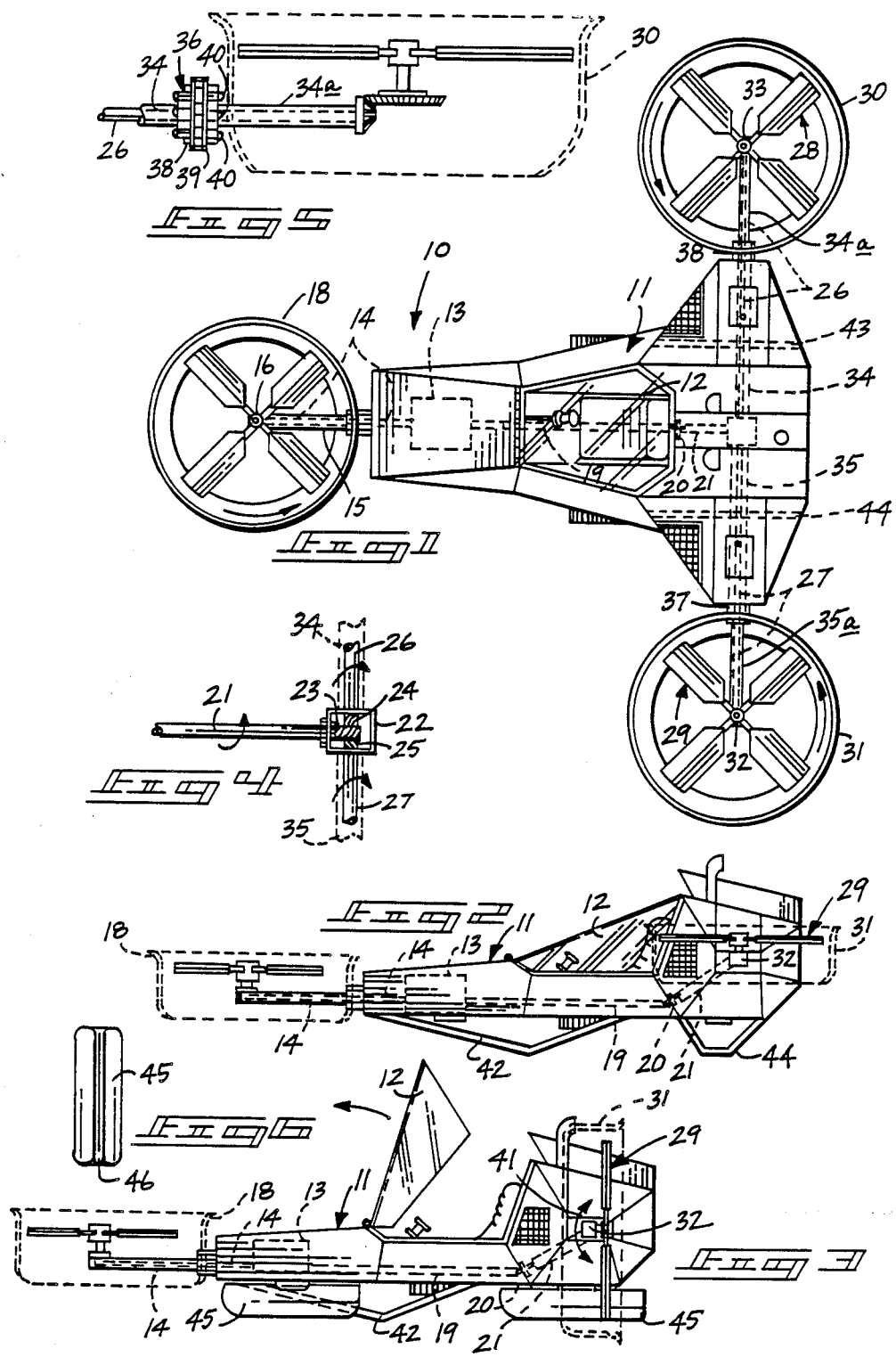

TOY AIR VEHICLE

BACKGROUND OF THE INVENTION

1. Field of the Invention

The field of invention relates to air driven vehicles, and more particularly pertains to a new and improved toy air vehicle that is convertible from an aircraft to a boat.

2. Description of the Prior Art

The use of heavier-than-air vehicles capable of airborne travel is well known in the prior art. Various types of wings and helicopter-type aircraft are available for this purpose. For example, U.S. Pat. No. 3,045,951 to Freeland utilizes four impellers circumferentially positioned about an axis to provide an aircraft capable of vertical flight. The Freeland patent relies on the use of various passages and the like for directional orientation of the vehicle.

U.S. Pat. No. 3,929,721 to Dobson sets forth a heavier-than-air toy air car wherein a forwardly oriented turban blade provides an air cushion underlying the vehicle to elevate the vehicle above the ground for traverse thereof.

U.S. Pat. No. 3,589,058 to Labat sets forth a toy air cushioned vehicle configured as a boat to provide an air cushion underlying the boat for travel of the boat across expanses of water.

U.S. Pat. No. 4,313,512 to Jutres sets forth an air cushion-type vehicle utilizing a plurality of propeller mounted engines to provide axial and orthogonal flow to the vehicle to effect traverse of the vehicle over distances. A plurality of vanes radiating outwardly of the funnel assist in direction air into a plenum chamber and outwardly of the plenum chamber of the vehicle to provide an air cushioning of the vehicle.

U.S. Pat. No. 2,989,269 to Le Bel sets forth a convertible vehicle utilized as an aircraft and as an automobile including retractable wheels and the like for effecting a convertible apparatus.

As such, it may be appreciated that there is a continuing need for a new and improved toy air vehicle which may be converted from air to sea travel by use of orienting associated impellers and in this respect, the present invention substantially fulfills this need.

SUMMARY OF THE INVENTION

In view of the foregoing disadvantages inherent in the known types of toy air powered vehicles now present in the prior art, the present invention provides a toy air powered vehicle that may be conveniently oriented for directional hover flight, as desired, and may be further easily and effectively converted as a water traversing vehicle. As such, the general purpose of the present invention, which will be described subsequently in greater detail, is to provide a new and improved toy air vehicle which has all the advantages of the prior art air powered vehicles and none of the disadvantages.

To attain this, the present invention comprises a vehicular housing including a motor positioned medially and fowardly housing including a motor positioned medially and forwardly thereof including a plurality of drive shafts, one directed forwardly of the motor to power a forwardly positioned impeller and a rear drive shaft directed to a power splitting gear housing to simultaneously provide power to two laterally positioned impellers. The rear impellers may be pivoted for directional orientation of the vehicle or positioned at a vertical orientation and utilized with associated snap-on pontoons for conversion of the vehicle to an air powered boat.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of others sructures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved toy air vehicle which has all the advantages of the prior art toy air vehicles and none of the disadvantages.

It is another object of the present invention to provide a new and improved toy air vehicle which may be easily and efficiently manufactured and marketed.

It is a further object of the present invention to provide a new and improved toy air vehicle which is of a durable and reliable construction.

An even further object of the present invention is to provide a new and improved toy air vehicle which is susceptible of a low cost of manufacture with regard to both materials and labor, and which accordingly is then susceptible of low prices of sale to the consuming public, thereby making such toy air vehicle economically available to the buying public.

Still yet another object of the present invention is to provide a new and improved toy air vehicle which provides in the apparatuses and methods of the prior art some of the advantages thereof, while simultaneously overcoming some of the disadvantages normally associated therewith.

Still another object of the present invention is to provide a new and improved toy air vehicle that may be converted from an airborne to a water traversing vehicle.

Yet another object of the present invention is to provide a new and improved toy air vehicle provided with a rear plurality of impellers that may be pivoted for directional orientation and travel of the air powered vehicle and pivoted to a vertical orientation for powering of the vehicle as an air boat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the instant invention.

FIG. 2 is a side orthographic view of the instant invention.

FIG. 3 is a side orthographic view of the instant invention illustrating the impellers pivoted to a vertical position and the use of pontoons for conversion of the vehicle to a boat.

FIG. 4 is a top orthographic view of the rear gear housing and associated drive shafts.

FIG. 5 is an orthographic side view of a rear impeller and housing illustrating the pivoting connection of the housing.

FIG. 6 is a top orthographic view of a typical pontoon utilized with the instant invention.

DESCRIPTION OF THE PREFERRED EMBODIMENT

With reference now to the drawings, and in particular to FIGS. 1 to 5 thereof, a new and improved toy air vehicle embodying the principles and concepts of the present invention and generally designated by the reference numeral 10 will be described.

More specifically, it will be noted that the toy air vehicle apparatus 10 essentially comprises a "T" shaped body housing 11 formed with a centrally located pivotal hatch 12 and a forwardly oriented motor 13. The motor 13 may be of conventional electrical or gasoline powered type well known in the art and well within the purview of the instant invention. The motor 13 is formed with a first drive shaft 14 forwardly extending from the motor and positioned through a first cylindrical housing 15 and driving first impeller 17 through a first forward gear housing 16 utilizing orthogonally oriented bevel gears. The first impeller 17 is formed with a first shroud 18 therearound integrally formed to the first cylindrical housing 15 to direct a velocity of air therethrough and create a desired venture effect with the inwardly directed lower circumference of the shroud 18 accepting air upwardly from the outwardly turned upper perimeter of the shroud 18, as illustrated in FIG. 2 for example.

A second drive shaft 19 extends rearwardly of the motor 13 and is formed to a universal joint 20 that directs power through a third drive shaft 21 and into a gear housing 22, as illustrated in FIG. 4. Within gear housing 22 is a first bevel gear 23 integrally secured to the third drive shaft 21 and directs rotational force orthogonally to the third drive shaft 21 by a respective second and third bevel gear formation 24 and 25 that are respectively secured to a fourth and fifth drive shaft 26 and 27.

The fourth drive shaft 26 directs power to a second impeller 28 and the fifth drive shaft 27 directs power to a third impeller 29 that are formed with respective second and third shrouds 30 and 31 of construction equal to that as illustrated in FIG. 2 of the first shroud 28. A third and fourth gear housing 32 and 33 are formed to the third and second impellers respectively and utilize bevel gears, as illustrated in FIG. 5 for example, to direct power to the respective impellers. A second cylindrical housing 34 and a third cylindrical housing 35 are secured integrally to the gear housing 22 and encompass the fourth and fifth drive shafts respectively, as illustrated in FIG. 4. Reference to FIG. 5 illustrates the means by which the second and third impellers are rotated for directional orientation of the vehicle during an airborne traverse wherein a second cylindrical housing extension 34a and a third cylindrical housing extension 35a are secured to the respective second and third cylindrical housings 34 and 35 by a joint formation, as illustrated in FIG. 5. As illustrated, a first rotational joint 36 secures the respective second cylindrical housing 34 and a second cylindrical housing extension 34a together wherein similarly a second rotational joint 37 effects a similar operation with respect to the third impeller 29. A first flange member 38 is integrally formed to the second cylindrical housing 34 and a second flange member 39 is integrally formed to the second cylindrical housing extension 34a wherein a series of through extending apertures extend through the respective flange members 38 and 39 with threaded fasteners 40 removably positioned through the through extending apertures that may be removable to rotate the respective cylindrical housings as desired. It may be understood that various other connections may be utilized, such as frictional joints that may be manipulated and rotated by various mechanical drives, such as drive belts and the like, but for purposes of illustration and effectiveness, the respective rotational joints 36 and 37 are adequate for the toy air vehicle 10 in use. Underlying the body housing 11 is a forward skid 42 and a plurality of rear skids comprising a first and second rear skid respectfully 43 and 44 that accept snap-on pontoons 45, as illustrated in FIG. 3, within longitudinal grooves 46 of the pontoons 45.

When the pontoons 45 are secured to the skids 42, 43, and 44, the respective second and third impellers 28 and 29 are rotated in the direction of rotation of an arrow 41, as illustrated in FIG. 3, to align the impellers 28 and 29 with the longitudinal axis of the body housing 11 and thereby the toy air vehicle 10 may be utilized as a pontoon boat for water traverse.

As to the manner of usage and operation, therefore, of the present invention, the same should be apparent from the above description. Accordingly, no further discussion relative to the manner of usage and operation will be provided.

With respect to the above description then, it is to be realized the the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle for land and water traverse comprising,
    an elongate body housing defining a forward end and a rear portion extending orthogonally of a longitudinal axis of said body housing, and
    a first impeller formed with a first surrounding venturi shroud secured forwardly of said forward end, and
    a second impeller formed outwardly of one side of said rear portion with a second surrounding venturi shroud secured therearound, and
    a third impeller formed outwardly of a second end of said rear portion remote from said first impeller with a third shroud surrounding impeller shroud fixedly secured around said third impeller, and
    a motor means positioned in said housing for providing power to said first, second, and third impellers, and
    drive shaft means to impart rotational drive from said motor means to said first, second, and third impellers, and
    first and second rotational joints positioned adjacent respective of said second and third impellers to enable rotation of said second and third impellers and said second and third shrouds relative to said body housing, and
    wherein said rotational joints include first and second flanges fixedly secured to first and second cylindrical housings surrounding a portion of said drive shaft means wherein said first and second flanges includes through extending apertures and removable fasteners for rotating a second flange relative to a first flange to enable rotation of an adjoining impeller and surrounding venturi shroud.

2. A vehicle for land and water traverse as set forth in claim 1 wherein each of said respective first, second, and third venturi shroud include an upper rim outwardly extending and a lower rim inwardly extending to provide a venturi when said impellers direct air through said first, second, and third ventury shrouds.

3. A vehicle for land and water traverse as set forth in claim 2 wherein said vehicle housing includes a plurality of skids underlying said housing comprising a forward skid and a plurality of rear skids, and a plurality of pontoons are configured for press fit securement to said forward and rear skids for effecting water traverse of said vehicle.

4. A vehicle for land and water traverse as set forth in claim 3 wherein said second and third impellers are aligned with said longitudinal axis of said body housing for effecting water traverse of said vehicle.

5. A vehicle for land and water traverse as set forth in claim 4 wherein said second and third impellers are aligned relative to each other and said first impeller is forwardly oriented of said vehicle medially of said aligned second and third impellers.

* * * * *